United States Patent Office 3,467,727
Patented Sept. 16, 1969

3,467,727
ISOMERIZATION OF 2,3-DIMETHYLBUTENES
Samuel Kahn, Rutherford, N.J., assignor to Universal Oil Products Company, Des Plaines, Ill., a corporation of Delaware
No Drawing. Filed Oct. 10, 1966, Ser. No. 585,290
Int. Cl. C07c 5/24
U.S. Cl. 260—683.2                                       7 Claims

ABSTRACT OF THE DISCLOSURE 2,3-dimethylbutenes can be isomerized by contact with an activated clay catalyst. The 2-isomer can be converted to the 1-isomer and vice versa. The product can be used to make synthetic rubbers.

---

This invention relates to the isomerization of 2,3-dimethylbutenes and, more particularly, to the shifting of the double bond of such butenes by contacting it with an isomerization catalyst.

Butenes such as 2,3-dimethylbutenes-1 and -2 are valuable industrial chemicals having many uses, such as, for example, in preparing synthetic rubbers or increasing the octane rating of gasolines. These butenes are produced by various reactions, for example, the catalytic or thermal dehydrohalogenation of neohexylhalides. The 2,3-dimethylbutene product obtained by these reactions usually exists as a mixture of the 1 and 2 isomers. It is frequently desirable, however, for many of the uses of 2,3-dimethylbutenes, to have only one of the particular isomers substantially free of the other. Accordingly, it is important for the full utilization of these valuable olefins to be able to separate the particular isomers from each other and to be able to convert one isomer to the other. A particularly desirable manner for effecting this conversion would be to shift the double bond from the 1 to the 2 position or the reverse, from the 2 to the 1 position, by isomerization techniques. Isomerization of olefins, and particularly catalytic isomerizations, are often costly to carry out, however, because of the many problems involved, including destruction of the valuable olefin by polymerization. It has now been discovered, however, that the isomerization of 2,3-dimethylbutenes may be effected readily without destruction of the butene by using as a catalyst for such isomerization an activated clay.

Accordingly, an object of this invention is to provide a process for isomerizing 2,3-dimethylbutenes. Another object is to effect the isomerization by contacting the butenes with an activated clay catalyst whereby the double bond shift it readily achieved with little or no destruction of the butene through side reactions such as polymerization. These and other objects of this invention will be apparent from the following further detailed description thereof.

The isomerization of 2,3-dimethylbutenes is effected according to the process of this invention by reactively contacting the 2,3-dimethylbutenes with an activated clay catalyst at isomerization conditions. These clays comprise activated, naturally occurring clays which, in general, are hydrated alumina silicates which contain various proportions of silica and alumina and often also various admixtures of the oxides of iron, magnesium, titanium or calcium and which have been chemically activated by various treatments, including treatment with mineral acids such as sulfuric or hydrochloric acid. These clays include the various types of bentonite clays such as the montmorillonite type clays, generally described as a subclass or mineral constituent of bentonite clays, which are found throughout the world, although obtained commercially chiefly from deposits in Germany and the western parts of the United States. Other types of clays, such as the halloysites and the kaolinites as well as fuller's earth or the attapulgite type clays may be used in the process although the results obtained are not generally as desirable as those obtained with the montmorillonite type clays.

The activation of these clays is well known to those skilled in the art and is described in many technical articles and patents. For example, acid activating methods are described in BIOS Final Rep. 398, p. 4, Proceedings of Sud-Chemie A.G., Houben-Weyl, Methoden der Organischen Chemie 4th ed., vol. 4, Pt. 2, p. 149 (1955); Science of Petroleum, 3:1699–1705 (1938) and United States Patents No. 2,671,058 and No. 1,642,871. This acid treatment is effected in general by slurrying the raw clay with aqueous sulfuric or hydrochloric acid at high temperatures followed by filtering and washing the residue and finally drying the clay at elevated temperatures.

The montmorillonite type clays, which are the clays preferably used in the process of this invention, are readily available commercially in activated form under such trade names as "Super Filtrol" and "Tonsil." Typical analyses of "Super Filtrol" which is activated with sulfuric acid and "Tonsil" which is activated with hydrochloric acid are as follows:

SUPER FILTROL

| Component: | Weight percent |
|---|---|
| $SiO_2$ | 66.6 |
| $Al_2O_3$ | 15.4 |
| $MgO$ | 4.3 |
| $Fe_2O_3$ | 2.3 |
| $CaO$ | 2.2 |
| $TiO_2$ | 0.4 |
| $SO_3$ | 3.0 |
| Volatiles | 3.8 |

TONSIL

| | |
|---|---|
| $SiO_2$ | 72.5 |
| $Al_2O_3$ | 14.0 |
| $MgO$ | 1.5 |
| $Fe_2O_3$ | 4.0 |
| $CaO$ | 0.8 |
| Volatiles | 7.2 |

Since the activated clay catalysts used in the isomerization process of this invention have a tendency to readily absorb moisture, and since moisture levels above about 15 percent by weight in the catalysts have a tendency to unfavorably affect the reaction, it is advisable to take precautions to assure that the moisture content of the catalysts does not substantially exceed this level.

The isomerization conditions of temperature and pressure used to effect the isomerization are not critical and may be widely varied with the particular selection made to optimize the conversion being dependent upon such factors as the particular catalyst used, the particular isomer being converted, and the particular conversion rate desired. Generally, the temperature may range from about 0° to 150° C. with a more limited range of from about 15° to 85° C. being preferred. The pressures used in association with such temperatures usually should be sufficient to maintain a major proportion of the butenes in liquid phase and may range from subatmospheric to superatmospheric of 100 atmospheres or more. Usually, however, atmospheric pressure may be suitably used and particularly with the preferred temperature range. The quantity of the clay catalyst used will be dependent upon such factors as the temperature, the particular catalyst, and whether the process is run on a continuous or batch-type basis. For example, in a batch-type operation using an activated montmorillonite clay, a quantity of catalyst ranging from about 1 to 60 percent by weight of the 2,3-dimethylbutenes being converted is usually satisfactory with a more limited range of 5 to 50 or about 10 percent being preferred. While the isomerization may be effected in the absence of a solvent, quite surprisingly, solvents may be advantageously used and, in particular, aromatics such as benzene or alkylated benzenes. This is quite unexpected because usually olefins in the presence of an aromatic solvent and an acid acting catalyst normally would be expected to result in an alkylation of the aromatic material, and thus result in a loss of the valuable olefin. The contact time of the olefin and catalyst required to effect the desired conversion varies and is dependent upon such factors as temperature, catalyst, quantity of olefin, the degree of conversion desired, and whether the isomerization is effected on a continuous or batch-type basis.

The isomerization of 2,3-dimethylbutenes effected under the above conditions in the presence of an activated clay catalyst usually favors conversion of the 1 isomer to the 2 isomer until an equilibrium isomerization ratio of about 9 weight parts of the 2 isomer per 1 part of the 1 isomer is reached. Thus substantially pure 2,3-dimethylbutene-2 may be readily obtained by contacting 2,3-dimethylbutene-1 or a mixture of 2,3-dimethylbutene-1 and 2,3-dimethylbutene-2 with the catalyst and thereafter subjecting the catalyst-free product mixture to distillation to remove the small amount of 1 isomer from the higher boiling 2 isomer. The reverse conversion, namely the 2 isomer to the 1 isomer, may be readily effected according to this invention by utilizing the isomerization equilibrium and the lower boiling point of the 1 isomer. For example, a charge of 2,3-dimethylbutene-2 or a mixture of 2,3-dimethylbutene-2 and 2,3-dimethylbutene-1 may be contacted with the activated clay catalyst while continuously removing the 1 isomer from the mixture, for example, by distillation. This then results in a continuous conversion of the 2 isomer to the 1 isomer.

The process of this invention may be carried out on a batch-type, continuous, or semi-continuous basis. In a batch-type operation, for example, one illustrative procedure for converting 2,3-dimethylbutene-1 to 2,3-dimethylbutene-2 involves charging a quantity of the 2,3-dimethylbutene-1, either alone or admixed with a quantity of the 2 isomer and, if desired, with a solvent such as benzene, to a suitable reactor containing an appropriate quantity of an activated clay catalyst, for example, an acid activated montmorillonite clay. The mixture may then be stirred for the desired time while maintaining the appropriate temperature. The reaction mixture may then be filtered to remove the catalyst and the liquid filtrate distilled to remove the equilibrium quantity of the 1-isomer to leave 2,3-dimethylbutene-2 substantially free of the 1-isomer.

The following examples are offered to illustrate the isomerization process of this invention. They are not, however, intended to limit the invention to the particular catalysts, conditions or procedures illustrated.

Example I

The isomerization of 2,3-dimethylbutene was effected according to this invention by the following procedure:

To a reactor equipped with heating and mixing means and a distillation column overhead were charged 20 grams of an activated montmorillonite clay (Tonsil IFF) having a moisture content of about 14.9 percent, about 150 grams of benzene, and 42 grams of a mixture of the 1 and 2 isomers of 2,3-dimethylbutene. The mixture was stirred for about 20 hours with the temperature maintained at about 20° to 25° C. The reaction mixture was then filtered to separate the catalyst and the liquid filtrate atmospherically distilled with the major proportion distilling at 70° to 84° C. Analysis by gas liquid chromatography (G.L.C.) indicated the following weight percentage composition of the 2,3-dimethylbutene portion of the charge and product:

|  | Initial | End | Change |
| --- | --- | --- | --- |
| 2,3-dimethylbutene-1 | 36.6 | 15.5 | −21.1 |
| 2,3-dimethylbutene-2 | 60.6 | 82.0 | +22 |

Example II

The isomerization of 2,3-dimethylbutene was effected according to the general procedure of Example I using 42 grams of a mixture of the 1 and 2 isomers of 2,3-dimethylbutene and 3.5 grams of an activated montmorillonite clay (Tonsil IFF). With stirring the mixture was heated at about 25° C. for 16 hours. The temperature was then raised to 63° to 67° C. and maintained thereat for 4 hours. The catalyst-free product mixture boiled primarily over a range of 65° to 75° C. at atmospheric pressure. Analysis by G.L.C. indicated the following weight percentage composition of the 2,3-dimethylbutene portion of the charge and product:

|  | Charge | Product | Change |
| --- | --- | --- | --- |
| 2,3-dimethylbutene-1 | 43.0 | 12.9 | −30.1 |
| 2,3-dimethylbutene-2 | 53.0 | 82.2 | +29.2 |

Example III

The isomerization of 2,3-dimethylbutene was effected according to the general procedure of Example I using as charge 84 grams of a mixture of the 1 and 2 isomers of 2,3-dimethylbutene mixed with 175 grams of benzene and 7 grams of an activated montmorillonite clay (Tonsil IFF). With stirring the mixture was heated at 71° to 73° C. for about 20 hours. The catalyst-free product mixture boiled primarily over a range of 63° to 80° C. Analysis by G.L.C. indicated the following weight percentage composition of the olefin portion of the charge and product:

CHARGE

| Component: | Percent |
| --- | --- |
| 2,3-dimethylbutene-1 | 27.4 |
| 2,3-dimethylbutene-2 | 52.3 |
| Neohexene | 4.1 |
| Methylpentenes | 3.9 |
| High boiling material | 2.3 |

PRODUCT

| 2,3-dimethylbutene-1 | 7.6 |
| --- | --- |
| 2,3-dimethylbutene-2 | 89.6 |
| Neohexene | 0.3 |
| Methylpentenes | 0.8 |
| High boiling material | 1.6 |

Example IV

The isomerization of 2,3-dimethylbutene was effected according to this invention by the following procedure:

To a reactor equipped with heating and mixing means and a suitable distillation column were charged 1000 grams of a mixture of the 1 and 2 isomers of 2,3-dimethylbutene and 20 grams of activated montmorillonite clay (Tonsil IFF). The mixture was brought to reflux temperature (reflux ratio of 20 to 2) and about 700 grams of distillate were collected. Analysis by G.L.C. of the 2,3-dimethylbutene portion of the charge and product indicated the following weight percentage composition:

|  | Charge | Product | Change |
| --- | --- | --- | --- |
| 2,3-dimethylbutene-1 | 24.4 | 87.3 | +63.9 |
| 2,3-dimethylbutene-2 | 70.4 | 4.3 | −66.1 |

I claim as my invention:

1. A process for isomerizing a 2,3-dimethylbutene selected from 2,3-dimethylbutene-1 and 2,3-dimethylbutene-2 which comprises contacting the butene with from 1 to about 60 percent by weight of an activated clay catalyst at a temperature of from about 0° to 150° C. at atmospheric pressure.

2. The process according to claim 1 characterized in that 2,3-dimethylbutene-1 is isomerized to 2,3-dimethylbutene-2.

3. The process according to claim 1 characterized in that 2,3-dimethylbutene-2 is isomerized to 2,3-dimethylbutene-1.

4. The process according to claim 1 characterized in that the catalyst is an activated montmorillonite clay.

5. The process according to claim 1 characterized in that the isomerization is effected at a temperature of from about 15° to 85° C. at atmospheric pressure by contacting the butene with an activated montmorillonite clay.

6. The process according to claim 5 characterized in that 2,3-dimethylbutene-1 is isomerized to 2,3-dimethylbutene-2.

7. The process according to claim 5 characterized in that 2,3-dimethylbutene-2 is isomerized to 2,3-dimethylbutene-1.

References Cited

UNITED STATES PATENTS 2,386,468 10/1945 Ipatieff et al. _____ 260—683.2

FOREIGN PATENTS 549,139 11/1942 Great Britain.
978,308 12/1964 Great Britain.

OTHER REFERENCES

H. N. Dunning: "Review of Olefin Isomerization," Industrial and Engineering Chemistry, March 1953, pp. 552–558.

DELBERT E. GANTZ, Primary Examiner

G. J. CRASANAKIS, Assistant Examiner